May 26, 1931.  F. J. DUSEL  1,806,676

TIRE RIM

Filed Feb. 25, 1929

INVENTOR:
Frank J. Dusel
BY David E. Carlsen
ATTORNEY.

Patented May 26, 1931

1,806,676

UNITED STATES PATENT OFFICE

FRANK J. DUSEL, OF ST. PAUL, MINNESOTA

TIRE RIM

Application filed February 25, 1929. Serial No. 242,508.

My invention relates to tire rims for vehicles having pneumatic tires and the main object is to provide a simple, highly efficient and easily removable rim, the use of which reduces time and labor in removing it from a tire. Further objects and advantages are hereinafter fully set forth, reference being had to the accompanying drawings, in which,—

Figure 4:
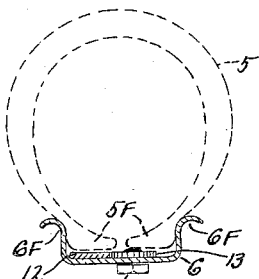
Fig. 4 is an enlarged cross sectional view of my tire rim through its adjustment bolt as on line 4—4 in Fig. 2, a casing of a tire being shown additionally in dotted lines only.

Referring to the drawings by reference numerals, 5 designates the casing of an inflatable tire of the usual type, with its interior adjacent flange parts, designated 5F in Fig. 4, retained in the usual manner between flanges 6F of the usual channel shaped (in cross section) tire rim 6.

My improved rim is sectional, four sections being illustrated and designated successively as 6A, 6B, 6C and 6D, of which 6A is a short section and the others comprising longer sections of predetermined lengths, all sections being hinged together successively as 7A, 7B and 7C. 8 are the usual rim lugs for securing the rim to a wheel provided with properly spaced bolts to engage them.

The free edge of rim section 6A may be provided with a fixed tongue 9 normally overlapping the adjacent inner face of the rim section 6D abutting it and provided with a securing screw 10.

Figure 3:
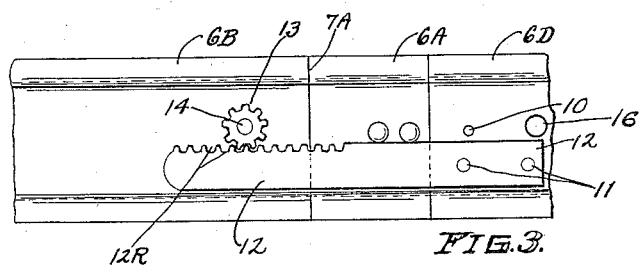
Fig. 3 is an exterior view of Fig. 2, looking toward the rim as from line 3—3 in Fig. 1.

On the outer face of the web of section 6D I secure as with rivets 11, a rack bar 12 projecting toward and over the outer face of section 6A, longitudinally and past said section to and over the face of section 6B, the bar 12 being actuated to lie close to said faces and its inner edge provided with teeth forming a rack 12R. 13 is a pinion normally engaging said rack (see Fig. 3) and fixed on a short stud 14 journaled in a bore in rim section 6B, said stud having a head 14H of polygonal form at the inner face of the web of section 6B and therefore accessible for engagement with a wrench.

It will now be seen that my sectional rim is normally in circular tire retaining form when in service, the tongue 9 and its screw 10 holding the abutting sections 6A and 6D together. To remove my rim from the tire, the screw 10 must first be taken out, then a wrench is applied to head 14H and its pinion 14 turned as in direction of arrow 15 (see Fig. 2). This causes rack bar 12 to move section 6A away from 6D, a spreading action.

Figure 1:
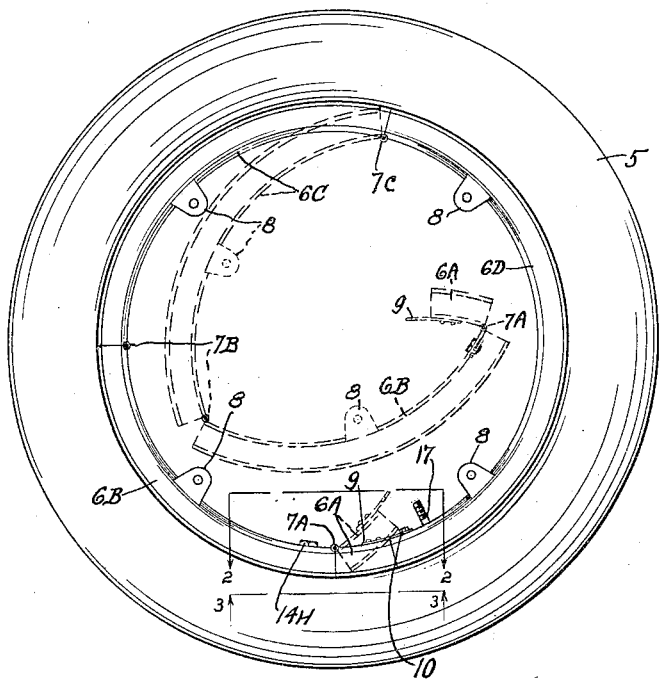
Fig. 1 is a vertical elevation of my improved tire rim in operative position on a pneumatic tire.

Then member 6A is free to be swung inwardly on its hinge 7A, after which the connected sections 6B and 6C may also be swung inwardly toward each other as to dotted line positions shown in Fig. 1 and the last rim section 6D is readily drawn away from contact with the tire casing and the entire collapsed rim easily removed from the tire.

Figure 2:
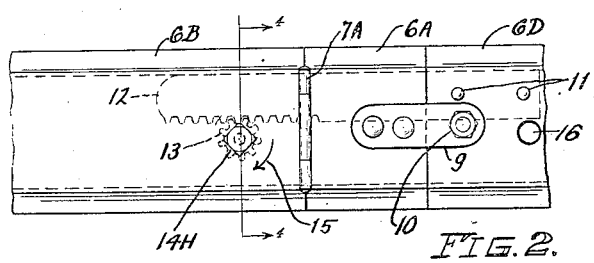
Fig. 2 is an enlarged detail view of the main joint part of my tire rim looking outwardly upon said part from the center of the rim, as on line 2—2 in Fig. 1.

In Fig. 2, 16 is an aperture for the usual valve tube 17 of a tire to project through, said tube being clearly shown in Fig. 1. Said tube aperture should be in the rim section 6D as shown, as this section is the first to be put in place and the last to be removed.

My improved tire rim has now been fully disclosed. It is obvious that there may be more or less sections but only four have been shown as amply illustrating the principles involved. Obviously no section should be as large as a half circle, but the largest section, as 6D, should be short enough for ready removal from the tire. Other modifications may be embodied without departing from the scope and spirit of my invention.

To put the rim in operative position it is merely held within the tire in collapsed form and one section, as 6D for example, pressed into contact with the inner rim parts of the casing 5, then the connected rim parts, as 6C, and 6B, pressed into place, the part of section B adjacent section A being alined with the free end of section 6D. It is apparent that when all sections but 6A are thus pushed into place the free edge of short section 6A will overlap the adjacent free edge of section 6D. At this time the rack 12 is of course in engagement with the pinion 13. Then the operator simply turns the pinion so that parts 6B and 6D will separate enough to permit section 6A to be pressed into place and secured to 6D by means of the screw 10. Now all the rim sections are in fixed tire retaining position and the tire and rim can be put on a wheel.

I claim:

1. A collapsible tire rim comprising a plurality of hingedly connected like metal rim sections and an end section comparatively short, the free end of said short section adapted to abut the free end of the adjacent other end section, a rack bar fixed on said latter section extending past said short section and over the adjacent face of the section hinged to the short section, rotary rack engaging means on said latter section adapted to spread or close the said sections to release the short rim section as described, and means for connecting said abutting parts to each other.

2. The structure specified in claim 1 in which said rack engaging means comprise a pinion meshing therewith and said pinion having a polygonal head exposed at the interior face of the rim section in which it is journaled for the purpose set forth.

In testimony whereof I affix my signature.

FRANK J. DUSEL.